US009948699B1

(12) United States Patent
Tauber et al.

(10) Patent No.: US 9,948,699 B1
(45) Date of Patent: *Apr. 17, 2018

(54) SCORING CONTENT BASED ON SOCIAL INTERACTION

(71) Applicant: Google Inc., Mountain View, CA (US)

(72) Inventors: Benjamin Tauber, San Francisco, CA (US); Sachin Jain, Milpitas, CA (US); Boris Mazniker, San Francisco, CA (US); Shimrit Ben-Yair, Sunnyvale, CA (US); Simon Tong, Mountain View, CA (US)

(73) Assignee: Google LLC, Mountain View, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/751,987

(22) Filed: Jun. 26, 2015

Related U.S. Application Data

(63) Continuation of application No. 13/798,968, filed on Mar. 13, 2013, now Pat. No. 9,098,176.

(60) Provisional application No. 61/614,490, filed on Mar. 22, 2012.

(51) Int. Cl.
*G06F 3/048* (2013.01)
*H04L 29/08* (2006.01)

(52) U.S. Cl.
CPC .............. *H04L 67/10* (2013.01); *H04L 67/02* (2013.01)

(58) Field of Classification Search
CPC ....................................................... G06F 3/048
See application file for complete search history.

(56) References Cited

U.S. PATENT DOCUMENTS

| 8,145,678 | B2 | 3/2012 | Ramsay, Jr. et al. |
| 8,171,128 | B2 | 5/2012 | Zuckerberg et al. |
| 8,307,066 | B2 | 11/2012 | Carter et al. |
| 2004/0122681 | A1* | 6/2004 | Ruvolo .................. G06Q 50/01 715/733 |
| 2009/0144392 | A1 | 6/2009 | Wang et al. |
| 2010/0049852 | A1 | 2/2010 | Whitnah et al. |
| 2010/0132049 | A1 | 5/2010 | Vernal et al. |

(Continued)

OTHER PUBLICATIONS

Ronald van Eijk et al., "We-centric, context-aware, adaptive mobile service bundles," Telematica Instituut, Freeband Frux D1.1, Nov. 30, 2004, 48 pages.

(Continued)

*Primary Examiner* — Peiyong Weng
(74) *Attorney, Agent, or Firm* — Fish & Richardson P.C.

(57) ABSTRACT

Methods, systems, and apparatus, including computer programs encoded on computer storage medium, for identifying a set of items of digital content displayed to a user; processing the set of items to identify a set of boost items, items within the set of boost items to be prominently displayed, processing comprising: receiving a close-ties score associated with a respective item, the close-ties score representing a relationship between the user and other users associated with the respective item and an importance of a social circle associated with the item to the user, determining that the close-ties score associated with the respective item exceeds a threshold close-ties score, and in response to determining that the close-ties score exceeds the threshold close-ties score, adding the respective item to the set of boost items; providing instructions for boosting a display of items in the set of boost items in a page displayed to the user.

18 Claims, 6 Drawing Sheets

(56) References Cited

U.S. PATENT DOCUMENTS

2012/0278388 A1* 11/2012 Kleinbart .............. G06Q 10/10
709/204
2013/0013595 A1 1/2013 Tseng et al.

OTHER PUBLICATIONS

Marc Steen et al., "Development of we-centric, context-aware, adaptive mobile services requires empathy and dialogue," Freeband Frux, 2005, 4 pages.
Alice Emily Marwick, "Selling Your Self: Online Identity in the Age of a Commodified Internet," Thesis for degree of Master of Arts, University of Washington, 2005, 192 pages.

* cited by examiner

SCORING CONTENT BASED ON SOCIAL INTERACTION

CROSS-REFERENCE TO RELATED APPLICATIONS

This application is a continuation of U.S. patent application Ser. No. 13/798,968, filed on Mar. 13, 2013, which claims the benefit of U.S. Provisional Application No. 61/614,490, filed on Mar. 22, 2012, the disclosure of which are expressly incorporated herein by reference in their entirety.

BACKGROUND

This specification generally relates to scoring content based on social interaction. Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

As a user's social network within the social networking service increases, the amount of digital content distributed to the user and the amount of digital content that the user interacts with can significantly increase. Consequently, the user's stream page may overwhelm the user with digital content, and the user can miss reading digital content.

SUMMARY

In general, innovative aspects of the subject matter described in this disclosure may be embodied in methods that include actions of identifying a set of items of digital content to be displayed to a user of a social networking service; processing the set of items to identify a set of boost items, items within the set of boost items to be prominently displayed, processing including: receiving a close-ties score associated with a respective item, the close-ties score representing a relationship between the user and other users associated with the respective item and an importance of a social circle associated with the item to the user, determining that the close-ties score associated with the respective item exceeds a threshold close-ties score, and, in response to determining that the close-ties score exceeds the threshold close-ties score, adding the respective item to the set of boost items; and providing instructions for boosting a display of one or more items in the set of boost items in a page displayed to the user. Other implementations of this aspect include corresponding systems, apparatus, and computer programs, configured to perform the actions of the methods, encoded on computer storage devices.

Innovative aspects of the subject matter described in this disclosure may be embodied in methods that include actions of identifying a set of items of digital content; processing the set of items to identify one or more of the items, processing including: determining a close-ties score associated with a respective item, the close-ties score representing a relationship between the user and other users associated with the respective item and an importance of a channel associated with the item to the user, determining that the close-ties score associated with the respective item exceeds a threshold close-ties score, and, in response to determining that the close-ties score exceeds the threshold close-ties score, adding the respective item to a set of boost items; and providing instructions for boosting a display of one or more items in the set of boost items in a page displayed to the user. Other implementations of this aspect include corresponding systems, apparatus, and computer programs, configured to perform the actions of the methods, encoded on computer storage devices.

These and other implementations may each optionally include one or more of the following features. For instance, actions further include defining a sub-set of boost items based on the set of boost items, the sub-set of boost items including less items than the set of boost items; processing further includes: determining that the respective item is potentially unread by the user, and adding the respective item to the set of boost items further in response to determining that the respective item is potentially unread by the user; processing further includes: determining that the respective item was distributed through the social networking service within a threshold time period based on a timestamp associated with the respective item, and adding the respective item to the set of boost items further in response to determining that the respective item was distributed through the social networking service within the threshold time period; the close-ties score of the respective item is determined based on interactions between the user and an author user of the respective item within one or more computer-implemented services; the one or more computer-implemented services include one or more of an electronic message service, a chat service and the social networking service; the interactions are at least partially based on a number of items that the author user has distributed to the user within the social networking service; the close-ties score of the respective item is determined based on interactions between the user and one or more participant users associated with the respective item, the interactions occurring within one or more computer-implemented services; the one or more participant users include at least one of a recipient user that the respective item was distributed to within the social networking service and an interacting user that interacted with the respective item within the social networking service; the close-ties score of the respective item is determined based on social circle interactions between the user and the social circle, the social circle having been defined by the user within the social networking service; an author user of the respective item is a member of the social circle; the social circle is identified from a plurality of social circles defined by the user that an author user of the respective item is a member of; the social circle is associated with a user-to-circle interactions score that is determined based on one or more of a volume associated with the social circle, interaction reciprocity between the user and members of the social circle, and contact reciprocity between the user and the members of the social circle; and a number of items provided in the sub-set of boost items is capped based on a threshold number of items that are to be boosted within a predefined time period.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
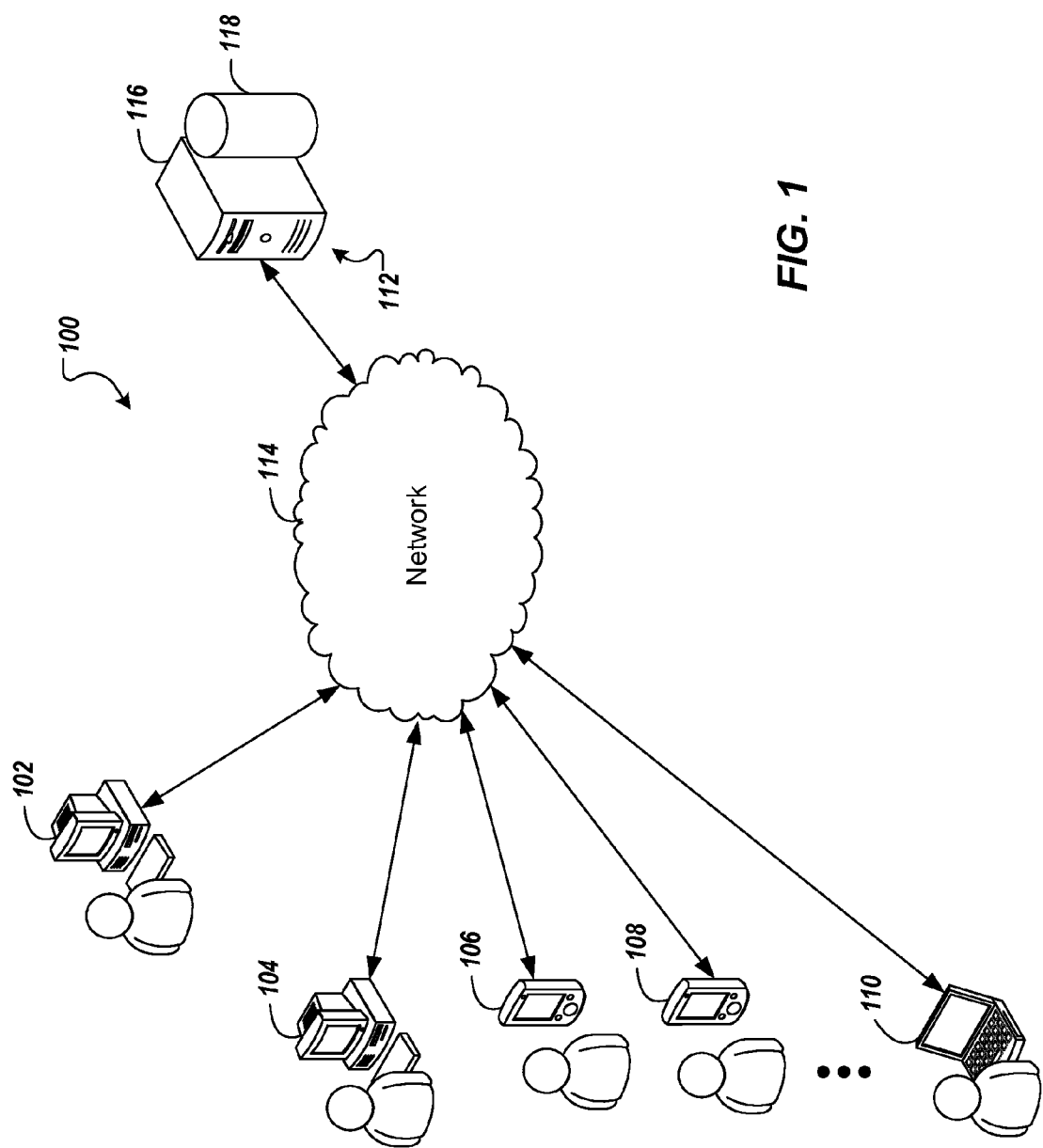
FIG. 1 is a diagram of an example network architecture.

In general, some implementations of the present disclosure are directed to selectively boosting items displayed in pages displayed to users of a social networking service. In some examples, a page can include a stream page that displays digital content that has been posted by the user to the social networking service and/or digital content distributed to the user through the social networking service. In some pages, a page can include a search results page that displays digital content that has been posted by the user to the social networking service and/or digital content distributed to the user through the social networking service as search results responsive to a submitted query. In particular, implementations of the present disclosure are directed to boosting items included in a plurality of items displayed to a user within a page displayed to the user. In some implementations, boosting an item can include prominently displaying the item within the page. In some examples, boosting includes changing a position of the item within the stream page. In some examples, boosting includes applying one or more visual and/or audible effects to the item. In some examples, each item that is to be displayed in the page is associated with an item score and a timestamp. Items can be displayed within the page of the user based on the respective item scores and/or timestamps. In some implementations the item score is provided as a close-ties score that represents a relationship between the user and one or more other users associated with the item. In some examples, the close-ties score represents a relative strength of the relationship between the user and the one or more other users associated with the item. In some examples, and based on respective close ties scores, unread items can be boosted to be displayed more prominently to the user.

For purposes of illustration, an example social networking service will be described. The example social networking service enables users to organize contacts into communications channels provided as social circles. It is appreciated, however, that implementations of the present disclosure can be used in other types of social networking services and are not limited to social networking services that include social circles.

In general, social circles are categories to which a user can assign contacts and better control the distribution and visibility of social networking items and/or other digital content distributed using the social networking service. In this manner, a social circle can function as a channel, or a portion of a channel, through which digital content can be distributed. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. As one example, the user can post an update about a work-related nuance to only a "coworker" circle, and spare other contacts within the social networking service from seeing information that is irrelevant to them.

FIG. 1 is a diagram of an example network architecture 100. The network architecture 100 includes a number of client devices 102, 104, 106, 108, 110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102, 104, 106, 108, 110 access the server device 112 to participate in a social networking service. For example, the client devices 102, 104, 106, 108, 110 can execute web browser applications that can be used to access the social networking service and/or an IM service. In another example, the client devices 102, 104, 106, 108, 110 can execute software applications that are specific to the social networking service and/or the IM service (e.g., social networking and/or IM "apps" running on smartphones).

Users interacting with the client devices 102, 104, 106, 108, 110 can participate in one or more computer-implemented services provided by one or more service providers. Example computer-implemented services can include the social networking service, a micro-blogging service, a blogging service, a document sharing service, an image sharing service and a video sharing service. By way of examples, user can participate in the social networking service provided by the server system 112 by distributing digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn."). Generally, users interacting with the client device 102, 104, 106, 108, 110 can also use the social networking service provided by the server system 112 to define social circles to organize and categorize the user's relationships to other users of the social networking service. Examples of the creation and use of social circles are provided in the description of FIG. 2.

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
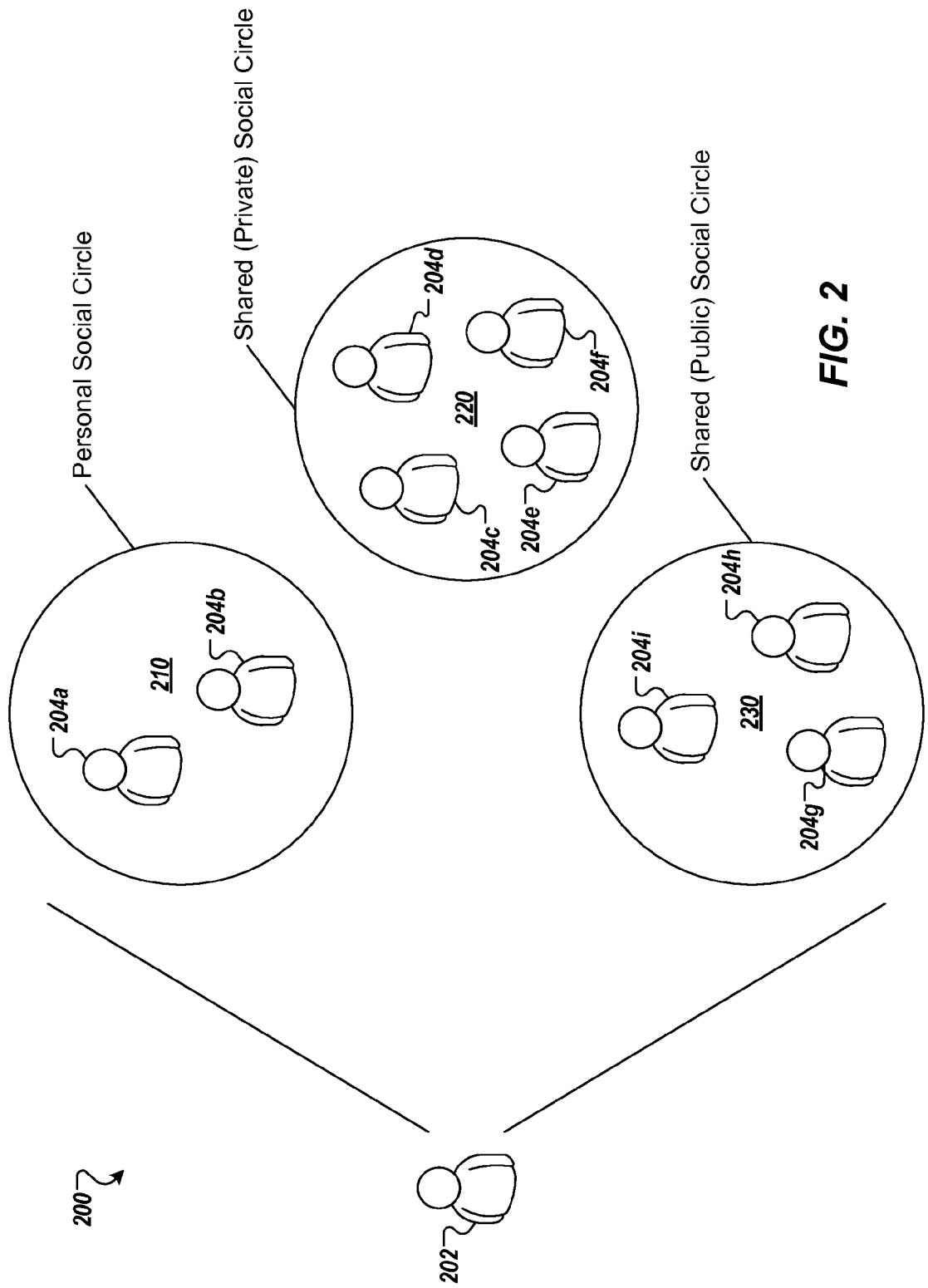
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a query-based social circle that can be automatically generated without input from the user 202. In some implementations, the social circle 240 can be generated based on information gathered from and has some commonality among the user 202 and the users 242a-242c (e.g., items, uploaded photos, check-ins, volunteered location information).

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (e.g., Surprise Party Attendees), while targeting selected postings to friends that are to be honored at the surprise party (e.g., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those items are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate an item and indicate one or more social circles for distribution of the item. In some implementations, an auto-complete component enables the user to type in part of the name of a social circle and/or individual contact to specify which social circles and/or individual contacts require delivery of the item content. During an item write-time, an item data set is transmitted from the user's client computing device (e.g., client device 102 of FIG. 1) to a distribution hub, which can be provided at a server (e.g., server system 112 of FIG. 1). The item data set includes a plurality of data. In some implementations, the item data set includes item content data (e.g., text, uniform resource indicator (URI)), timestamp data (e.g., a timestamp indicating the time that the item was generated), distribution data (e.g., contacts and/or one or more social circles), and identification (ID) data (e.g., an ID assigned to the item data set upon generation of the item).

In some implementations, and as discussed in further detail herein, other data can be appended to item data sets. An example of other data can be scoring data. In some examples, scoring data can include close ties scores and/or scores that can be used to determine close ties scores, as discussed in further detail herein. In some examples, other data can include read data. In some examples, read data can be provided for each recipient identified in the distribution associated with the item. The read data can indicate whether a particular recipient potentially read the item since the item was distributed. In this manner, it can be determined which recipients have potentially read the item, and which recipients have potentially not read the item. Item data sets can be stored in an item repository (e.g., a database) and the data can be periodically updated. In some examples, the data is updated in response to the occurrence of an event to the item. The data associated with the item can be retrieved for ranking and ordering of the item within a stream page of a user, as discussed in further detail herein.

In some implementations, the distribution data is processed to provide an access control list (ACL) that specifies which contacts within the social networking system are granted access to the item content. In some implementations, social affinity scores can also be processed to provide the ACL. For example, the distribution data can indicate that the item content is to be accessible by and/or distributed to a particular user. A social affinity score can be determined for the item and can be specific to a relationship between the item recipient and the author of the item. In some examples, if the social affinity score is below a threshold score, it is determined that the item content will not be accessible by and/or distributed to the particular user. Consequently, although the particular user had been explicitly targeted for distribution of the item by the author user, the particular user is not provided in the ACL for the item. In some examples, if the social affinity score is at or above the threshold score, it is determined that the item content will be accessible by and/or distributed to the particular user. Consequently, the particular user had been explicitly targeted for distribution of the item by the author and the particular user is provided in the ACL for the item.

Generally, the distribution hub determines end points the item data set is to be distributed to based on the ACL. More specifically, the set of contacts that may care about the item and/or that are allowed access to the item is determined based on the ACL, and the ID of the item is written to a per user/view index at the distribution hub. When fetching items to distribute to a user, the user/view index is accessed and the IDs of the various items that the user is allowed to view are determined. The item data sets are retrieved from a data store (e.g., data store 118 of FIG. 1) and are transmitted to a client device associated with the requesting user. In some implementations, and as discussed in further detail herein, the ACL can be provided based on the overall score, the quality score and/or the social affinity score.

Figure 3:
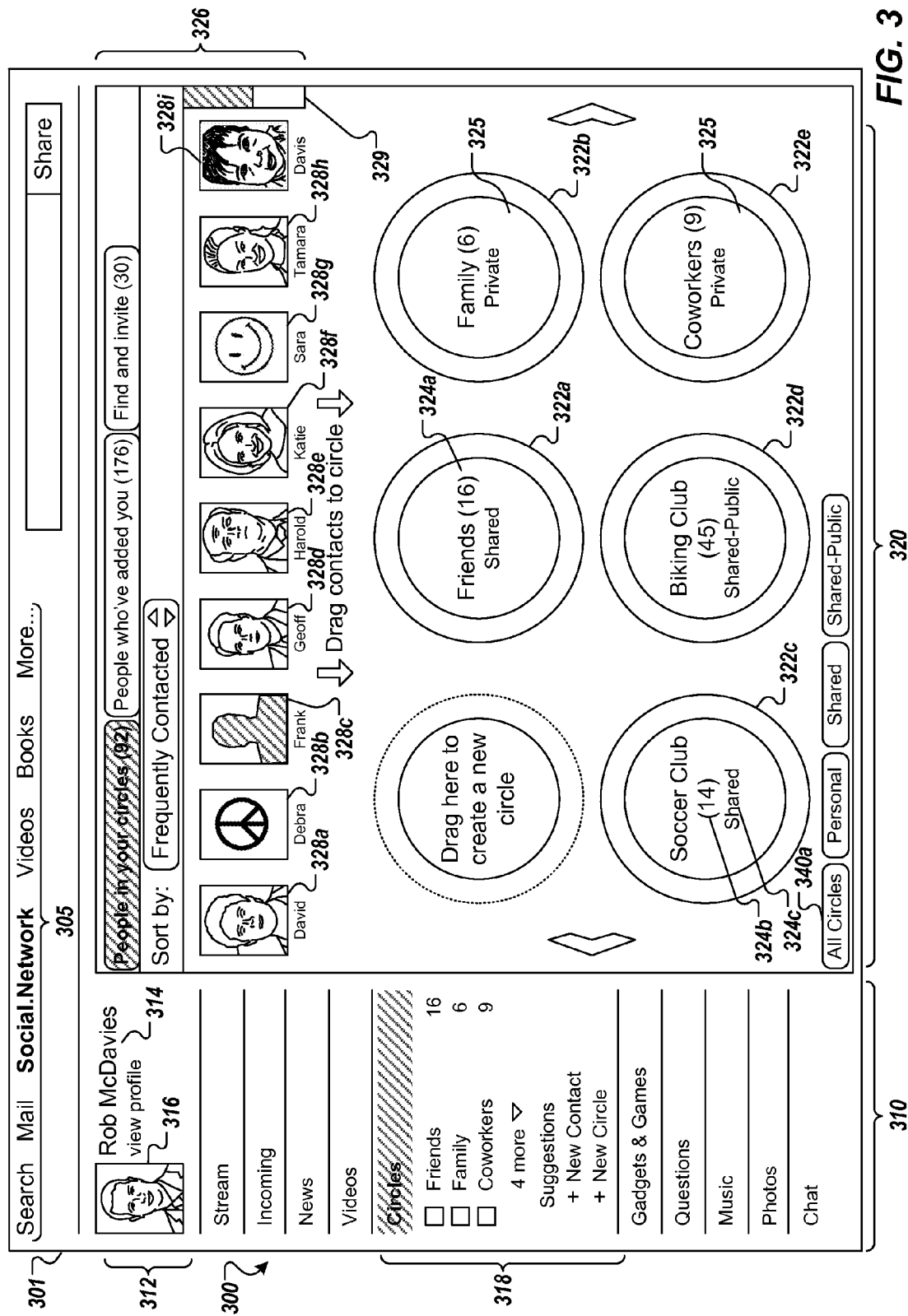
FIG. 3 depicts a screen-shot of example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

In some implementations, the social network menu 310 can include multiple individual settings for each social circle. For example, each social circle can have a social circle volume setting associated therewith that enables the user to set a volume of items to be displayed in the stream page from the social circle. For example, a user can decrease the number of displayed items from a maximum level (e.g., ALL items) to reduce the display of items distributed by members of the social circle. In this manner, the number of items by a particularly noisy social circle can be reduced from display to the user. A noisy social circle can include a social circle in which members very frequently distribute items. Example volume settings can include NONE, LESS, NORMAL, MORE and ALL. In some implementations, a user can also select the importance of a social circle using particular attributes, for example the user can set a descriptive name like family, best friends, close friends or friends (324a) to define a social circle.

Figure 4:
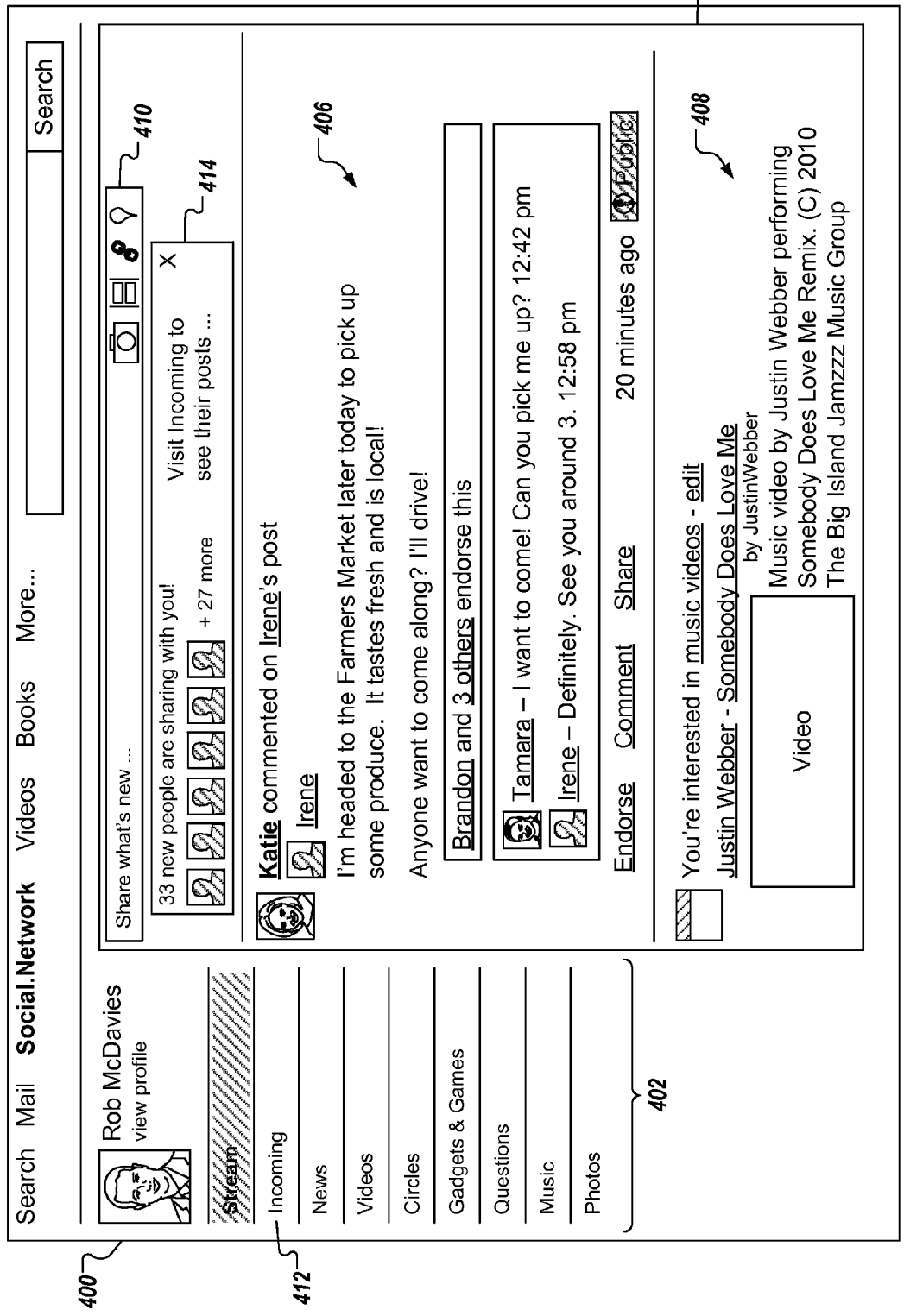
FIG. 4 depicts a screen-shot of an example stream page for a user of a social networking service.

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McDavies" and the stream page 400 displays items (e.g., digital content) that other users have shared with the user and/or items that the user has shared with other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

Implementations of the present disclosure are directed to selectively boosting items displayed in pages for users of a social networking service. In some examples, a page can include a stream page that displays digital content that has been posted by the user to the social networking service and/or digital content distributed to the user through the social networking service. In some pages, a page can include a search results page that displays digital content that has been posted by the user to the social networking service and/or digital content distributed to the user through the social networking service as search results responsive to a submitted query. In some implementations, the display of one or more unread items can be boosted to be more prominently displayed to a user based on an associated timestamp and a user-specific item score, provided as a close-ties score. When the user logs into the social networking service, a user-specific index of items that have been distributed to the user can be accessed. The index of items indicates items that can be displayed to the user within the stream page of the user. In some examples, for each item in the index of items, a timestamp and a user-specific close-ties score are provided. In some examples, user-specific read data is also provided. In some examples, unread items are identified based on the user-specific read data, and unread items that are to be boosted are identified based on respective user-specific close-ties scores to define a set of boost items. In some examples, each item in the set of boost items includes a close-ties score that exceeds a threshold close ties score. In some examples, the set of boost items is a sub-set of a parent set of boost items. For example, items in the parent set of boost items can include items that qualify for boosting in the stream page. However, instead of boosting all items in the parent set of items, the set of boost items can be provided to boost less than all items in the parent set of items. In some examples, the items associated with the highest close-ties scores can be included in the set of boost items (e.g., the top X out of Y close-ties scores are selected). In some examples, items can be randomly selected for inclusion in the set of boost items. In some examples, the number of boost items associated with a particular author can be limited for a given time period.

In some implementations, each item includes one or more close-ties scores associated therewith. Each close-ties score corresponds to a user associated with the item. In some examples, each close-ties score is associated with a respective user that the item was distributed to (a recipient user). In some examples, each close-ties score is determined based on information associated with the author user (e.g., the user that distributed the item through the social networking service), one or more recipient users (e.g., users to which the item was directly distributed) and interacting users (e.g., users to which the item was indirectly distributed and that have interacted with the item (e.g., endorsed, commented on, re-shared)).

By way of example, an item can be distributed by an author user to a first recipient user, a second recipient user and a third recipient user, where the third recipient user re-shares the item to an interacting user. In this example, the item can include a first close-ties score from the perspective of the first recipient user, where the first close-ties score is determined based on data associated with the author user, the second recipient user, the third recipient user and the interacting user. In this example, the item can also include a second close-ties score from the perspective of the second recipient user, where the second close-ties score is determined based on data associated with the author user, the first recipient user, the third recipient user and the interacting user. In some examples, if the item has potentially not been read by the first recipient user, the first close-ties score can be used to determine whether to boost the item in a stream page of the first recipient user. Similarly, if the item has potentially not been read by the second recipient user, the second close-ties score can be used to determine whether to boost the item in a stream page of the second recipient user.

In accordance with implementations of the present disclosure, an item distributed to a user can be selectively boosted within a stream page based on a user-specific close-ties score. In some examples, if the close-ties score is greater than a threshold close-ties score, the item is boosted within the stream page for more prominent display to the user. In some examples, if the item is identified as an unread item, if the item was distributed less than a threshold time ago, and if the close-ties score is greater than a threshold close-ties score, the item is boosted within the stream page for more prominent display to the user. In some examples, boosting an item includes changing a position of the item within the stream page. In some examples, boosting an item includes applying one or more visual and/or audible effects to the item.

As noted herein, the close-ties score ($S_{CT\_p}$) of the item (p) reflects a relevance of the item to the particular user based on relationships between the user, the author user (v), and one or more other users (w) associated with the item, and an implied importance of the social circle through which the item was distributed to the user. In some examples, the one or more other users (w) can include other recipient users and/or interacting users. In some examples, the social circle through which the item was distributed to the user can include a social circle of the user that the author user is a member of, as discussed in further detail below.

In some implementations, the user-specific close-ties score ($S_{CT\_p}$) is at least partially determined based on user-to-candidate interactions scores ($S_{CI\_x}$) and a user-to-circle interactions score ($S_{CI\_C}$). In some examples, the user-to-candidate interactions scores include a user-to-author interactions score ($S_{CI\_v}$) (e.g., the author user (v) is provided as the candidate), and a user-to-participants interactions score ($S_{CI\_w}$) (e.g., one or more participant users (w) are provided as candidates). In some implementations, the user-specific close-ties score can be further determined based on one or more other scores. In some examples, the other scores can include a social circle name score, author-to-user following scores and/or an author-to-user mention score. In some examples, and as discussed in further detail below, the social circle name score can be determined based on a user-specified name of the social circle, the author-to-user following scores can indicate the symmetry of a relationship between the user and the author user, and the author-to-user mention score is based on whether the user is explicitly mentioned in the item.

In some examples the social circle name score can be set to a maximum value (e.g., 1) if the name of the social circle is the same as a pre-defined name (e.g., FAMILY). In some examples, the social circle name score can be set to a minimum value (e.g., 0) if the name of the social circle is not the same as a pre-defined name (e.g., FAMILY). In some examples, the social circle name score can be set to a value that is between the minimum value and the maximum value based on a similarity of the name of the social circle to a pre-defined name. For example, a similarity score between the name of the social circle and the pre-defined name can be determined and the social circle name score can be provided based on the similarity score. In some examples, a first author-to-user following score can be set to a maximum value (e.g., 1) if the candidate is a direct contact of the user within the social networking service. In some examples, the first author-to-user following score can be set to a minimum value (e.g., 0) if the candidate is not a direct contact of the user within the social networking service. In some examples, the first author-to-user following score can be set to a value that is between the minimum value and the maximum value based on a degree of separation between the user and the author user within the social networking service. In some examples, a second author-to-user following score can be based on a percentage of contacts of the author user that are also contacts of the user within the social networking service.

In some examples, the author-to-user mention score is set to a maximum value (e.g., 1) if the author user explicitly mentions the user in an interaction with the item (e.g., within the original item, in a comments to the item, the comment explicitly mentioning the user). In some examples the author-to-user mention score can be set to a minimum value (e.g., 0) if the author user does not explicitly mention the user in an interaction with the item.

In some implementations, the user-specific close-ties score can be further determined based on one or more bonuses and/or penalties. In some examples, a bonus can reflect a greater likelihood that the item may be important to the user. In some examples, bonus values can be added to the close-ties score if a certain number of images and/or videos are included in the item and/or if the author user rarely distributes items through the social networking service. In some examples, a penalty can reflect a greater likelihood that the item may not be important to the user. In some examples, penalty values can be subtracted from the close-ties score if the number of users that the item was distributed to is greater than a threshold number of users and/or if the item is of a particular type (e.g., the item includes a video chat that is only active for a predetermined period of time). In some examples, a penalty value can be subtracted from the close-ties score, if the author user frequently distributed items through the social networking service. In some examples, a posting frequency can be determined based on a number of items distributed by the author user in a given time period and, if the posting frequency exceeds a threshold posting frequency, a penalty value can be subtracted from the close-ties score.

In some examples, the close-ties score is determined as a sum of the various component scores (e.g., the user-to-author interactions score, the user-to-circle interactions score, the social circle name score, the author-to-user following scores, the user-to-participants interaction score and/or the author-to-user mention score), the bonus values and the penalty values. In some examples, the sum can be provided as a weighted sum where a weight is applied to each component score, bonus value and/or penalty value. In this manner, respective influences of each component score, bonus value and/or penalty value.

By way of example, the user-to-candidate interactions scores ($S_{CI\_x}$) are determined based on interactions that the user has had with candidates associated with the item. As discussed herein, a candidate can include the author user and one or more participant users. In some examples, the participant users include other recipient users and/or interacting users. In some examples, the interactions include interactions of each of the candidates and the user in one or more computer-implemented services. As noted above, the user-to-candidate interactions scores ($S_{CI\_x}$) include a user-to-author interactions score ($S_{CI\_v}$), which considers the author user as the candidate, and a user-to-participants interactions score ($S_{CI\_v}$), which considers the participant users as candidates.

In some examples, a user-to-candidate interactions score ($S_{CI\_x}$) (e.g., the user-to-author interactions score ($S_{CI\_v}$), or the user-to-participants interactions score ($S_{CI\_w}$)) is determined based on interactions between the user and the candidate (e.g., the author user, or one or more participant users) through one or more computer-implemented services (e.g., the social networking service, a micro-blogging service, a blogging service, a document sharing service, an image sharing service and a video sharing service). In some examples, the user-to-candidate interactions score can also be based on reciprocity of data sharing, last name sharing and frequency of items sharing. In some implementations, the user-to-candidate interactions score can be determined based on a number of electronic messages sent to the candidate user from the user through a computer-implemented electronic message service. In some examples, the number of electronic messages can be provided as a normalized value that ranges between a minimum value and a maximum. In some examples the number of electronic messages can be normalized based on the total number of electronic messages sent by the user using the computer-implemented electronic message service. In some examples, older messages can be discounted such that the older messages have less influence on the value determined for the number of electronic messages. In this manner, older interactions do not impact the number of electronic messages as much as more recent messages.

In some implementations, the user-to-candidate interactions score can be determined further based on a number of electronic messages sent to the candidate user from the user through a computer-implemented chat service. In some examples, the number of chat messages can be provided as a normalized value that ranges between a minimum value and a maximum. In some examples the number of chat messages can be normalized based on the total number of chat messages sent by the user using the computer-implemented chat message service. In some examples, older chat messages can be discounted such that the older chat messages have less influence on the value determined for the number of chat messages. In this manner, older interactions do not impact the number of chat messages as much as more recent interactions.

In some implementations, the user-to-candidate interactions score can be determined further based on a number of social interactions from the user to the candidate user within the social networking service. In some examples, the social interactions can include private interactions and public interactions, where private interactions include interactions that are not disclosed to other users of the social networking service and public interactions include interactions that are disclosed to other users of the social networking service. In some examples, private interactions can include private comments from the user to the candidate user, private endorsements from the user to items distributed by the candidate user, private shares of items distributed by the candidate user from the user to other users of the social networking service. In some examples, public interactions can include public comments from the user to the candidate user, public endorsements from the user to items distributed by the candidate user, public shares of items distributed by the candidate user from the user to other users of the social networking service. In some examples, the number of social interactions can be provided as a sum of the private interactions and the public interactions. In some examples, the sum can be provided as a weighted sum where weights are applied to each of the private interactions and weights are applied to each of the public interactions. In this manner, the influence of each of the private interactions and the public interactions can reflect a significance of each. In some examples, weighting can be applied such that the private interactions influence the number of social interactions more heavily than do public interactions.

In some implementations, the user-to-candidate interactions score can be further based on an interaction rate. In some examples, the interaction rate can be determined based on the number of social interactions and an adjusted number of shows. In some examples, the adjusted number of shows can be determined based on a number of shows and the number of social interactions. In some examples, the number of shows indicates the number of times an item distributed by the candidate user was displayed in a stream page of the user. In some examples, the adjusted number of shows can be determined based on the number of social interactions alone, if the number of shows is equal to zero. In some examples, the adjusted number of shows can be provided as a maximum of one of the number of shows and the number of social interactions. In some examples, one or both of the number of shows and the number of social interactions can be weighted. In some implementations, the interaction rate can be determined as a ratio based on the number of social interactions and the adjusted number of shows. In some examples, the number of social interactions can be provided in the numerator and the adjusted number of shows can be provided in the denominator.

In some implementations, the user-to-candidate interactions score is determined based on the number of electronic messages, the number of chat messages and the interaction rate. In some examples, weighting can be applied to one or more of the number of a first type of electronic messages (e.g., sent through a computer-implemented electronic message service), the number of a second type of electronic messages (e.g., sent through a computer-implemented chat service) and the interaction rate to adjust the relative influence of each in determining the user-to-candidate interactions score. In some examples, the user-to-candidate interactions score is provided as the minimum of the number of the first type of electronic messages, the number of the second type of messages and the interaction rate. In some examples, the user-to-candidate interactions score is provided as the minimum of the number of the first type of electronic messages, the number of the second type of electronic messages, the interaction rate and a constant. In this manner, the constant can provide a cap for the user-to-candidate interactions score.

With particular reference to the user-to-participants interactions score ($S_{CI\_w}$) (e.g., where each participant user is considered as a candidate), a user-to-participant interactions score is determined for each participant associated with the item, and the user-to-participants interactions score is determined based on the user-to-participant interactions scores. In some examples, the user-to-participants interactions score is determined as an average of the user-to-participant interactions scores for participant users associated with the item. That is, each user-to-participant interactions score is determined as discussed above with respect to the user-to-candidate interactions score, and the user-to-participants interactions score is provided as an average of the user-to-participant interactions scores.

In some examples, the user-circle interaction score ($S_{CI\_C}$) is determined based on the relevance of a social circle for a user, including multiple indicators. In some implementations, the social circle considered for the user-circle interaction score ($S_{CI\_C}$) can include a social circle of the user that the author user is a member of. In some examples, the author user can be a member of a plurality of social circles. In some examples, user-circle interaction scores can be determined for each social circle of the user that the author user is a member of, and the user-circle interaction score having the highest value can be used in determining the user-specific close-ties score.

Some examples of user-circle interaction indicators can include the name of circle, social affinity and reciprocity with members of the circle, social affinity among the members of the circle, a social circle volume value, the origin of the circle (e.g., created by the user or shared to the user), the total number of social circles a user belongs to and other social circle attributes. In some examples, if the social circle volume value is equal to or less than a threshold volume value (e.g., LESS), the user-circle interaction score is set equal to a minimum value (e.g., 0). In some examples, if the social circle volume value is exceeds a threshold volume value (e.g., LESS) and the name of the social circle is equal to a pre-defined name (e.g., FAMILY), the user-circle interaction score is set equal to a maximum value (e.g., 0).

In some implementations, if the social circle volume value is exceeds a threshold volume value (e.g., LESS), but the name of the social circle is not equal to the pre-defined name (e.g., FAMILY), the user-circle interaction score can be determined based on an average number of interactions, a reciprocal rate and a volume multiplier. In some examples, the user-circle interaction score can be determined based on one or more constants, the average number of interactions, the reciprocal rate and the volume multiplier. In some examples, the volume multiplier is set a first value based on whether the social circle volume value is set to a first volume value (e.g., NORMAL) and is set to a second value based on whether the social circle volume value is set to a second volume value (e.g., MORE), where the first value is less than the second value.

In some implementations, the average user-to-candidate interaction score can be determined based on user-to-candidate interaction scores between the user and each member (e.g., candidate) of the social circle. In some examples, an average number of interactions is determined based on a pre-defined constant and an interactions ratio. In some examples, the interactions ratio is provided as a ratio of a mean user-to-candidate interactions score within the social circle to a maximal user-to-candidate interactions score within the social circle. In some implementations, the reciprocal rate is determined as a ratio based on a number of symmetric contacts provided in the social circle. In some examples, the ratio can be provided as the ratio of the number of contacts in the social circle that have a symmetric relationship with the user in the social networking service to the number of contact in the social circle.

Figure 5:
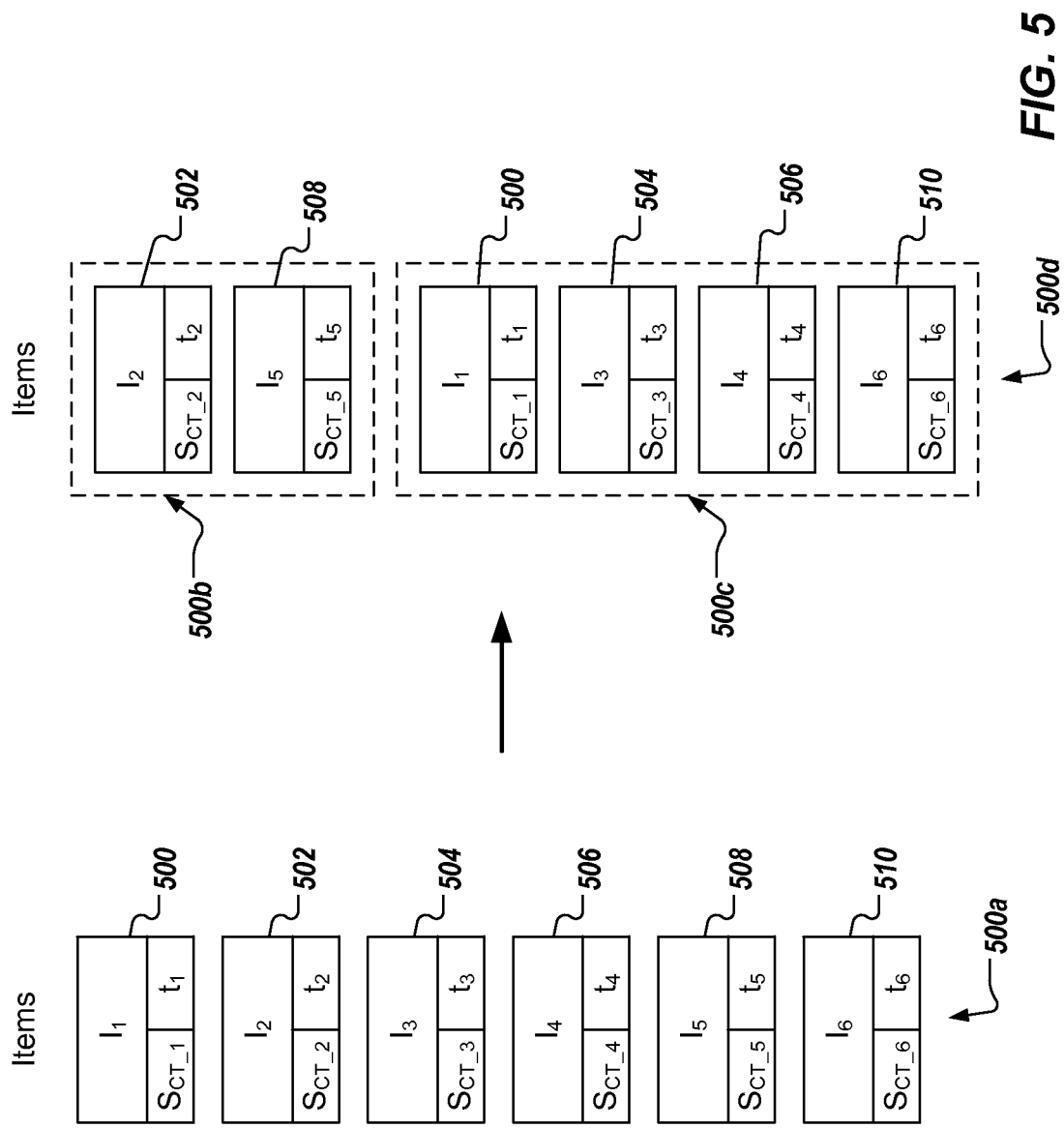
FIG. 5 depicts example item boosting in accordance with implementations of the present disclosure.

FIG. 5 depicts example item boosting in accordance with implementations of the present disclosure. FIG. 5 includes example items 500, 502, 504, 506, 508, 510. Each item $I_1$ 500, $I_2$ 502, $I_3$ 504, $I_4$ 506, $I_5$ 508, and $I_6$ 510 includes a close ties score ($S_{CT\_1}$, $S_{CT\_2}$, $S_{CT\_3}$, $S_{CT\_4}$, $S_{CT\_5}$, $S_{CT\_6}$, respectively) and timestamp ($t_1$, $t_2$, $t_3$, $t_4$, $t_5$, $t_6$, respectively) associated therewith. The close-ties scores of an item are specific to the user. In some examples, the close ties scores of an item are dynamic in that each close ties score of an item can change based on, for example, events and social relationships between the user and other users (e.g., candidates) over time. In some implementations, current close ties score of an item and timestamp data are retrieved in response to a request to display items to the user (e.g., when the user logs into the social networking service, when the user clicks on the stream page, when the user refreshes the stream page, or when the stream page is automatically refreshed). In some implementations, the close-ties score and timestamp data are periodically updated. In some implementations, data stored in the index of items is automatically updated when a timestamp and/or a close-ties score for an item changes.

With continued reference to FIG. 5, an initial collection of items 500a is provided. The initial collection of items 500a includes all items $I_1$ 500, $I_2$ 502, $I_3$ 504, $I_4$ 506, $I_5$ 508, and $I_6$ 510 that are to be displayed to the user. In some implementations, a set of boost items can be defined based on whether in item has potentially been read by the user, the close-ties score of the item and the timestamp of the item. In some examples, the close-ties score of each item can be compared to a threshold close-ties score and any potentially unread items having a close-ties score that exceeds the threshold close-ties score can be included in the set of boost items. In some examples, any potentially unread items having a close-ties score that exceeds the threshold close-ties score and that was distributed within a threshold time period can be included in the set of boost items. In some examples, the threshold time period can include the last day, the last two days, or the last week, etc. In some examples, several items can be included in the set of boost items. In some implementations, only a limited number of items included in the set of boost items are boosted. Consequently, boosted sub-set of boost items can be defined.

In the depicted example, some items in the initial collection of items 500a, have a close-ties score that exceeds the threshold close-ties score. In the depicted example, items 502, 504, 508, 510 each qualifies for inclusion in the set of boost items (e.g., have a close-ties score that exceeds the threshold close-ties score, is an unread item and was distributed within the threshold time period). However, in this example, the number of items that can be boosted in the stream page is limited to two items. Consequently, a sub-set of boost items 500b can be provided and can include the items 502, 508. In the depicted example, the item 502 can be ranked higher than the item 508 even if out of chronological order based on the respective timestamps (e.g., $t_5$ is more recent than $t_1$). In some examples the remainder of the items are provided in an item set 500c and can be displayed based on a predefined display strategy (e.g., in chronological order based on the respective timestamps, ranking of items based on scores). Consequently, when the user accesses the stream page, the items 502, 508 can be displayed more prominently than the items 500, 504, 506, 510 (e.g., the items can be displayed in the following order from top to bottom: item 502, item 508, item 500, item 504, item 506 and item 510.

In some implementations, a threshold number of boosts can be provided over a given time period. In some examples, only X items are boosted each day even though Y items qualify to be boosted (where X is less than Y).

Figure 6:
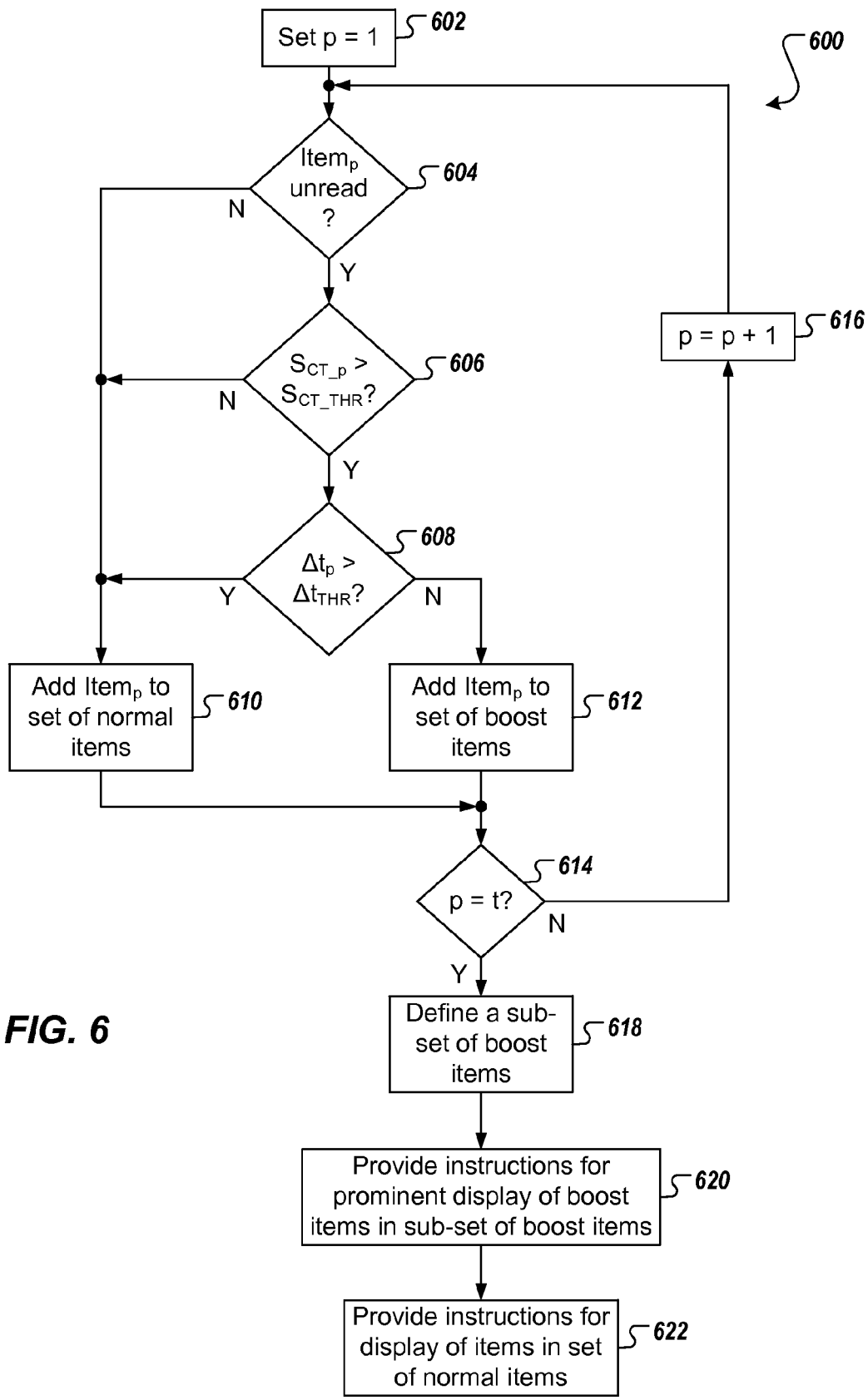
FIG. 6 is a flowchart of an example process that can be executed in implementations of the present disclosure.

FIG. 6 is a flowchart of an example process 600 that can be executed in implementations of the present disclosure. In some implementations, the example process 600 can include operations that are performed using one or more computer programs executed using one or more data processing apparatus (e.g., one or more client-side computing devices and/or one or more server-side computing devices). The example process 600 can be used for a set of items [item$_1$, . . . , item$_t$] to be displayed to a user.

A counter p is set equal to 1 (602). It is determined whether an item$_p$ is potentially unread (604). If the item$_p$ is potentially read by the user, the item$_p$ is added to a set of normal items (610). If the item$_p$ is potentially unread by the user, it is determined whether the user-specific close-ties score associated with the item ($S_{CT\_p}$), exceeds the threshold close-ties score ($S_{CT\_THR}$) (606). If $S_{CT\_p}$ does not exceed $S_{CT\_THR}$, the item$_p$ is added to a set of normal items (610). If $S_{CT\_p}$ exceeds $S_{CT\_THR}$, it is determined whether a time difference ($\Delta t_p$) exceeds a threshold time difference ($\Delta t_{THR}$) (608). In some examples, $\Delta t_p$ is determined as a difference between the timestamp associated with the item and a current time (e.g., the time at which the item is to be displayed to the user). For example, the set time interval $\Delta t_{THR}$ could be defined such that only items shared within the past X hours are eligible for prominent display. If $\Delta t_p$ exceeds $\Delta t_{THR}$, the item$_p$ is added to a set of normal items (610). If $\Delta t_p$ does not exceed $\Delta t_{THR}$, the item$_p$ is added to the set of boost items (612). It is determined whether the counter p is equal to t (e.g., have all of the items in the set of items [item$_1$, . . . , item$_t$] been considered) (614). If p is not equal to t, p is incremented (616) and the process 600 loops back to determine whether the next item should be added to the set of boosted or the set of normal items.

If p is equal to t, a sub-set of boost is defined (618). By way of example, although X items have been determined to be eligible for prominent display, only Y items are able to be prominently displayed (e.g., X>Y). Instructions for prominent display of the items in the sub-set of boost items are provided (620). For example, instructions for prominent display can include displaying the items in the sub-set of boost items at the top of the stream page and/or applying one or more visual effects to items in the sub-set of boost items. Instructions for display of items in the normal set of items are provided (622).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

The invention claimed is:

1. A computer-implemented method that is executed using one or more processors, the method comprising:
    identifying, by a system, a set of items of digital content to be displayed to a user of a computer-implemented social networking service;
    determining, by the system, for each item of digital content of the set of items of digital content, i) an interaction score based on a relationship between the user and other users associated with the item of digital content, and ii) an author-to-user following score based on a percentage of contacts of an author user that distributed the item of digital content through the computer-implemented social networking service that are also contacts of the user within the computer-implemented social networking service;
    determining, by the system, for each item of digital content of the set of items of digital content, a user-specific score for the item of digital content based on the interaction score and the author-to-user following score;
    identifying a subset of items of digital content of the set of items of digital content based on the user-specific score for each item of digital content of the set of items of digital content; and
    providing instructions for boosting to a greater prominence a display of one or more items in the subset of items of digital content in a stream displayed to the user.

2. The method of claim 1, further comprising determining, for each item of digital content of the set of items of digital content, a similarity score between a name of a social circle associated with the item of digital content and a pre-defined name, wherein the user-specific score for the item of digital content is further based on the similarity score.

3. The method of claim 1, wherein determining, for each item of digital content of the set of items of digital content, the user-specific score for the item of digital content is further based on whether the user is mentioned within the item of digital content.

4. The method of claim 1, wherein determining, for each item of digital content of the set of items of digital content, the user-specific score for the item of digital content is further based on a distribution frequency of items of digital content by the author user within the social networking service.

5. The method of claim 1, further comprising:
    determining, for each item of digital content of the set of items of digital content, that the item of digital content is unread by the user; and
    adding the item of digital content to the subset of items of digital content further in response to determining that the item of digital content is unread by the user.

6. The method of claim 1, further comprising:
    determining, for each item of digital content of the set of items of digital content, that the item of digital content was distributed through the social networking service within a threshold time period based on a timestamp associated with the item of digital content; and
    adding the item of digital content to the subset of items of digital content further in response to determining that the item of digital content was distributed through the social networking service within the threshold time period.

7. A hardware system comprising:
    a computing device; and
    a computer-readable medium coupled to the computing device and having instructions stored thereon which, when executed by the computing device, cause the computing device to perform operations comprising:
        identifying a set of items of digital content to be displayed to a user of a computer-implemented social networking service;
        determining for each item of digital content of the set of items of digital content, i) an interaction score based on a relationship between the user and other users associated with the item of digital content, and ii) an author-to-user following score based on a percentage of contacts of an author user that distributed the item of digital content through the computer-implemented social networking service that are also contacts of the user within the computer-implemented social networking service;
        determining for each item of digital content of the set of items of digital content, a user-specific score for the item of digital content based on the interaction score and the author-to-user following score;
        identifying a subset of items of digital content of the set of items of digital content based on the user-specific score for each item of digital content of the set of items of digital content; and
        providing instructions for boosting to a greater prominence a display of one or more items in the subset of items of digital content in a stream displayed to the user.

8. The system of claim 7, further comprising determining, for each item of digital content of the set of items of digital content, a similarity score between a name of a social circle associated with the item of digital content and a pre-defined name, wherein the user-specific score for the item of digital content is further based on the similarity score.

9. The system of claim 7, wherein, determining for each item of digital content of the set of items of digital content, the user-specific score for the item of digital content is further based on whether the user is mentioned within the item of digital content.

10. The system of claim 7, wherein determining, for each item of digital content of the set of items of digital content, the user-specific score for the item of digital content is further based on a distribution frequency of items of digital content by the author user within the social networking service.

11. The system of claim 7, the operations further comprising:
    determining, for each item of digital content of the set of items of digital content, that the item of digital content is unread by the user; and
    adding the item of digital content to the subset of items of digital content further in response to determining that the item of digital content is unread by the user.

12. The system of claim 7, the operations further comprising:
    determining, for each item of digital content of the set of items of digital content, that the item of digital content was distributed through the social networking service within a threshold time period based on a timestamp associated with the item of digital content; and adding the item of digital content to the subset of items of digital content further in response to determining that the item of digital content was distributed through the social networking service within the threshold time period.

13. Non-transitory computer storage media encoded with one or more computer programs, the one or more computer programs comprising instructions that when executed by data processing apparatus cause the data processing apparatus to perform operations comprising:

identifying, by a system, a set of items of digital content to be displayed to a user of a computer-implemented social networking service;

determining, by the system, for each item of digital content of the set of items of digital content, i) an interaction score based on a relationship between the user and other users associated with the item of digital content, and ii) an author-to-user following score based on a percentage of contacts of an author user that distributed the item of digital content through the computer-implemented social networking service that are also contacts of the user within the computer-implemented social networking service;

determining, by the system, for each item of digital content of the set of items of digital content, a user-specific score for the item of digital content based on the interaction score and the author-to-user following score;

identifying a subset of items of digital content of the set of items of digital content based on the user-specific score for each item of digital content of the set of items of digital content; and providing instructions for boosting to a greater prominence a display of one or more items in the subset of items of digital content in a stream displayed to the user.

14. The computer storage media of claim 13, further comprising determining, for each item of digital content of the set of items of digital content, a similarity score between a name of a social circle associated with the item of digital content and a pre-defined name, wherein the user-specific score for the item of digital content is further based on the similarity score.

15. The computer storage media of claim 13, wherein determining for each item of digital content of the set of items of digital content, the user-specific score for the item of digital content is further based on whether the user is mentioned within the item of digital content.

16. The computer storage media of claim 13, wherein determining, for each item of digital content of the set of items of digital content, the user-specific score for the item of digital content is further based on a distribution frequency of items of digital content by the author user within the social networking service.

17. The computer storage media of claim 13, the operations further comprising:

determining, for each item of digital content of the set of items of digital content, that the item of digital content is unread by the user; and adding the item of digital content to the subset of items of digital content further in response to determining that the item of digital content is unread by the user.

18. The computer storage media of claim 13, the operations further comprising:

determining, for each item of digital content of the set of items of digital content, that the item of digital content was distributed through the social networking service within a threshold time period based on a timestamp associated with the item of digital content; and adding the item of digital content to the subset of items of digital content further in response to determining that the item of digital content was distributed through the social networking service within the threshold time period.

* * * * *